W. OJCZYK.
TOY DRAFT ANIMAL.
APPLICATION FILED APR. 12, 1917.
1,243,208.
Patented Oct. 16, 1917.
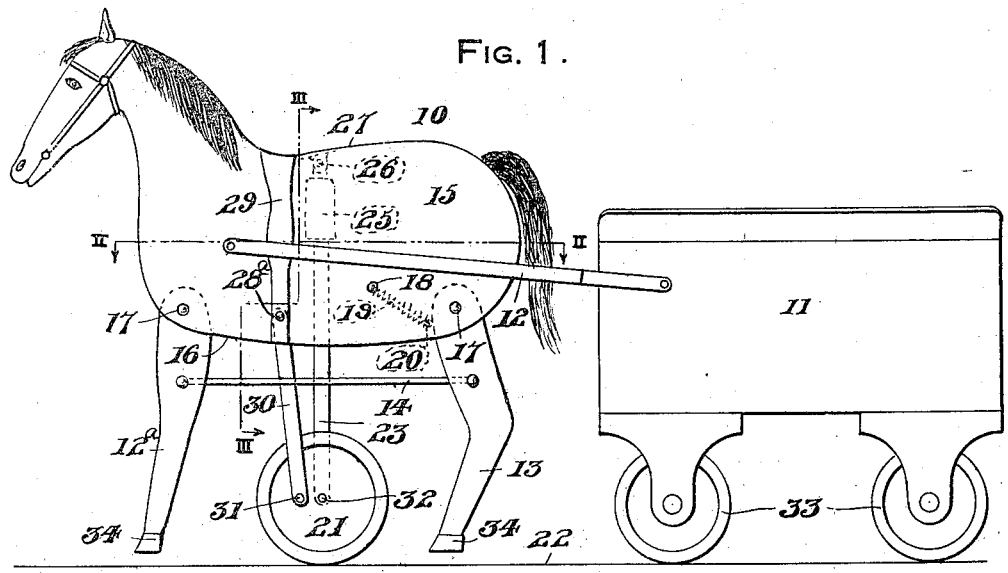
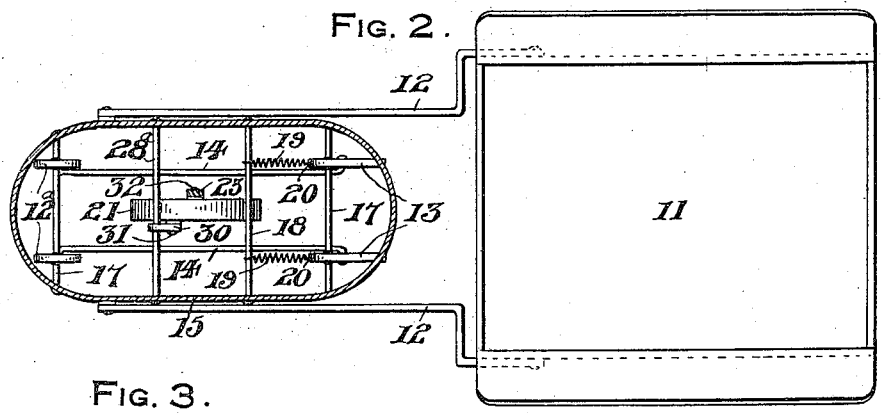
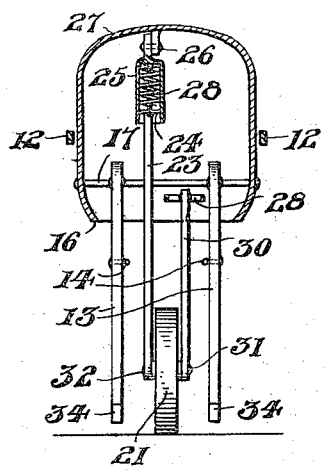
Inventor
W. Ojczyk
By A. M. Wilson
Attorney

UNITED STATES PATENT OFFICE.

WALDYSLAW OJCZYK, OF CLEVELAND, OHIO.

TOY DRAFT-ANIMAL.

1,243,208.     Specification of Letters Patent.     Patented Oct. 16, 1917.

Application filed April 12, 1917. Serial No. 161,497.

*To all whom it may concern:*

Be it known that I, WALDYSLAW OJCZYK, a subject of the Emperor of Austria, residing at Cleveland, in the county of Cuyahoga and State of Ohio, have invented certain new and useful Improvements in Toy Draft-Animals, of which the following is a specification.

This invention relates to certain new and useful improvements in toy draft animals.

The primary object of the invention is the provision of a toy in the nature of a draft animal or horse having the appearance of walking when moved forwardly, the device being easy and inexpensive to manufacture.

A further object of the device is the provision of a toy horse readily pushed or trundled along in an upright position, the same being provided with mechanism which imparts an up and down movement to the animal as well as walking movements to the horse's legs.

With these general objects in view and others that will appear as the nature of the invention is better understood, the same consists in the novel construction, combination and arrangement of parts hereinafter fully described, illustrated in the accompanying drawing and pointed out in the appended claims.

In the drawing forming a part of this application and in which like numerals refer to corresponding parts throughout the several views.

Figure 1 is a side elevation of the device attached to a cart.

Fig. 2 is a horizontal sectional view taken upon line II—II of Fig. 1, and,

Fig. 3 is a transverse sectional view taken upon line III—III of Fig. 1.

It will be understood that the toy animal herein described may be of any size or nature desired, for instance, the same may be in the shape of an elephant or a camel instead of the horse 10 but the present embodiment of the device illustrates the said horse attached forwardly to a four wheeled cart 11 by means of pivotal links 12 representing the shafts of the vehicle.

The horse 10 is provided with two front legs 12$^a$ and two hind legs 13 with the legs at each side of the horse pivotally connected together by links 14. The body 15 of the horse is hollow and open at the bottom as at 16 while rods 17 are arranged through the body 15 upon which the said legs 12$^a$ and 13 are dependingly pivoted.

A rod 18 is also arranged transversely through the body 15 for anchoring the forward ends of springs 19, said springs having their rear ends secured as at 20 to the forward sides of the rear legs 13 for normally maintaining the legs in their vertical position.

A wheel 21 is arranged substantially centrally beneath the body 15 for supporting the latter upon a suitable surface such as the road-bed 22, the said wheel being centrally journaled by means of an axle 32 upon the lower end of a post 23 having its upper end longitudinally provided with a designated form of head 24 longitudinally slidable within a tubular casing 25 pivoted as at 26 to the horse's back or top wall 27 of the body 15. A spring 28 connects the head 24 with the inner end of the casing 25 whereby the wheel 21 is resiliently as well as pivotally connected to the body 15.

A transverse rod 28$^a$ is provided through the body 15 adjacent the lower end thereof at a point adjacent the representation of harness band or girth 29 as shown in Fig. 1, a link 30 being pivoted to the rod 28$^a$ and also to a stub axle 31 carried by the wheel 21.

From this detailed description of the device the complete operation thereof will be apparent, the horse 10 being mounted for movement upon the wheel 21 and the cart 11 being mounted upon its wheels 33. By pushing the device in either direction and revolving the wheel 21, the eccentric mounting of the link 30 gives the body 15 an up and down movement which is permitted by the pivotal movement of the post 23 while the spring 28 tends to return the body 15 to its elevated position and also cushions the movement of the said body. This movement of the body 15 resembles the movements of a horse galloping while feet 34 of the horse's legs 12$^a$ and 13 engage the road-bed 22 when the body 15 is depressed and the forward movement of the body tends to pivotally move the legs rearwardly while the same are returned forwardly by the spring 19, the said movements of the horse's legs further presenting the appearance of an animal in motion. A toy is arranged which may be formed of any desired material such as metal and is easy and inexpensive to manufacture, may be pleasingly decorated and is capable of being readily operated by a child.

What I claim as new is:—

1. A toy comprising a cart, shafts carried thereby, an animal form of body pivoted to said shafts, pairs of legs pivoted to the said body, a link member pivotally connected to a leg of each pair, normally positioning springs for the said legs, a mounting wheel carried by the said body, and means connected with the wheel and body for imparting oscillating movement to the body as the wheel is rotated and causing the lower ends of the legs to engage the ground.

2. A toy comprising a cart, shafts carried thereby, an animal form of body pivoted to said shafts, pairs of legs pivoted to the said body, a link member pivotally connected to a leg of each pair, normal positioning springs for the said legs, a mounting wheel substantially centrally arranged beneath said body, a link pivotally connected at its ends to the wheel and body, the connection with the wheel being eccentric of the latter, and a post concentrically connected at the lower end with the wheel and at its upper end resiliently connected to the body whereby during rotation of the wheels, the legs engage the ground.

3. A toy comprising a cart, shafts carried thereby, a hollow horse shaped body open at the bottom thereof pivoted to said shafts, pivotally connected legs swingingly carried by said body from points located therein, means for normally maintaining the legs in vertical position, a supporting wheel for the body, and means connecting the wheel and body adapted for imparting a shifting movement to the latter during the operation of the device and to cause the legs to engage the ground.

4. A toy comprising a cart, shafts carried thereby, a hollow horse shaped body open at the bottom thereof pivoted to said shafts, a supporting wheel therefor, legs pivoted to said body, a casing pivoted centrally within and to the top of said body a post having its upper end resiliently slidably mounted within the said casing and with its lower end centrally journaled to said supporting wheel, and a link pivoted at its upper end within said body and having its lower end eccentrically pivoted to the wheel to cause the legs to engage the ground.

In testimony whereof I affix my signature.

WALDYSLAW OJCZYK.

Copies of this patent may be obtained for five cents each, by addressing the "Commissioner of Patents, Washington, D. C."